INVENTORS P. L. RICHARDS
G. E. SMITH
BY
*Kenneth W. Mater*
ATTORNEY 3,436,545
INFRARED MODULATOR MAGNETICALLY BIASED TO CYCLOTRON RESONANCE CONDITION
Paul L. Richards, Summit, and George E. Smith, Berkeley Heights, N.J., assignors to Bell Telephone Laboratories, Incorporated, New York, N.Y., a corporation of New York
Filed Dec. 30, 1963, Ser. No. 334,146
Int. Cl. H04b 9/00
U.S. Cl. 250—199          6 Claims This invention relates to high frequency electromagnetic wave transmission and, more particularly, to modulation at microwave frequencies for carrier frequencies in the infrared.

The combination of variable polarization plane rotation devices and polarization selective transmission devices to effect amplitude modulation of a transmitted signal has long been known. The Faraday rotation principle has been extended into the microwave range by the use of magnetized gyromagnetic materials such as ferrite. As recently disclosed in the copending application of J. F. Dillon, Jr., Ser. No. 206,102, filed June 28, 1962, and assigned to the assignee of this application, now U.S. Patent 3,245,314 issued Apr. 12, 1966, rotation device utility has been further extended to visible light frequencies by the use of certain trihalides of chromium as the rotation element.

One advantage of the use of optical carrier frequencies in communication systems is the increased information capacity afforded. In order, however, to make efficient use of this increased information bearing capacity, high frequency modulation techniques, typically in the microwave range, are desirable.

The above-mentioned Dillon application discloses a microwave modulation arrangement useful in the visible range. However, the disclosed arrangements have limited application in the infrared portion of the spectrum.

It is therefore the object of the present invention to modulate, at microwave frequencies, an infrared carrier.

In furtherance of this object, a solid material having low charge carrier density and light effective mass is subjected to a magnetizing field causing cyclotron resonance in the infrared at a given frequency which is between the plasma frequency of the material and its lowest interband transition frequency. By applying linearly polarized energy of frequency slightly different from the cyclotron resonance frequency, rotation of the plane of polarization without severe attenuation will occur. In accordance with the invention, modulation is achieved by passing a modulating electric current through the material. Variations in the current magnitude produce variations in the relaxation time associated with the material and thereby change the amount of polarization plane rotation experienced by the wave upon traversal of the material. By introducing a polarization selective device between the rotation means and the subsequent detector, a modulated signal, whose amplitude is proportional to the magnitude of the current within the rotator, is produced in the detector. The lattice temperature of the rotator is advantageously held at a low temperature, typically at the temperature of liquid helium.

By selecting the operating frequnecy to be on the side of the cyclotron resonance characteristic, relaxation time modulation produces an amplitude modulated signal directly from a traversal of the semiconductive element. The transmission losses introduced by the semiconductor are, however, higher than in the polarization rotation arrangement.

According to a preferred embodiment of the invention, a sample of indium antimonide at 4.2° K. is magnetically biased and is illuminated with plane polarized infrared wave energy at a frequency sufficiently different from the cyclotron resonance frequency determined by the strength of the biasing field to experience low attenuation and significant polarization rotation. For indium antimonide, the strength of the magnetic biasing field is typically 10 kilogauss, the cyclotron resonance frequency 65 cm.$^{-1}$ and the frequency of incident energy 60 cm.$^{-1}$. The indium antimonide is simultaneously subjected to a microwave voltage differential, causing current to flow through the material. The current raises the carrier temperature within the material, while the temperature of the lattice remains substantially constant. The carrier temperature, which can be modulated at speeds up to one kilomegacycle, determines the relaxation time associated with the material, the rotation per unit length imparted being proportional to the relaxation time. A second polarizer, positioned in the path of energy emerging from the sample, is oriented at 90° to the rotated energy in the absence of modulation current. When current is passed through the sample, the rotation imparted by the sample changes in proportion to the current amplitude, thus allowing some or all of the beam to pass through the second polarizer, depending upon the instantaneous beam polarization.

The above and other objects of the present invention, its features and various advantages, will be more readily understood from reference to the accompanying drawing and to the detailed description thereof.

Figure 1:
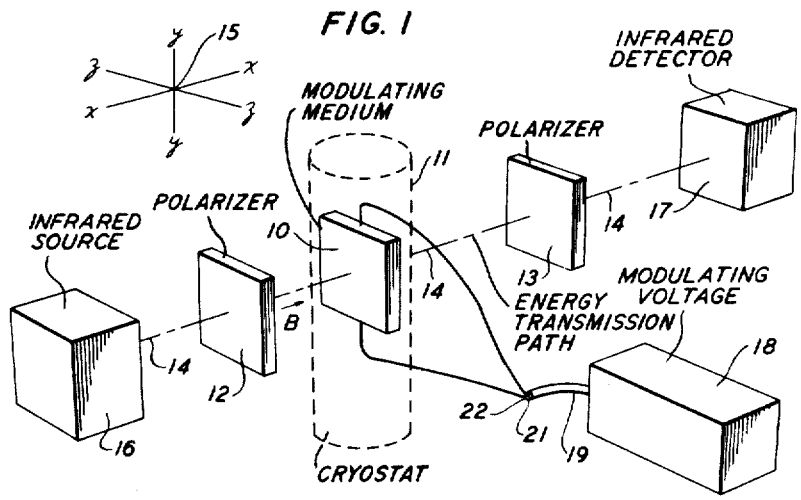
FIG. 1 is a schematic view of a rotation and modulation arrangement in accordance with the present invention.

Referring now to FIG. 1 in detail, there is illustrated an infrared rotation system in which medium 10 is a thin single crystal slab of a material having low carrier density, $n$, and low effective mass, $m^*$. Such a material, of which indium antimonide and bismuth antimony alloy are typical examples, is chosen to exhibit cyclotron resonance, a phenomenon described in an article by Dresselhaus et al., beginning at p. 556 of vol. 98 of Physical Review (1955), at infrared frequencies. Slab 10 is disposed within a low temperature medium, shown in FIG. 1 in dashed outline as cryostat 11. An external magnetic field B, advantageously supplied for example by a superconducting magnet not shown, is applied to slab 10 of sufficient strength to place the material near cyclotron resonance for the frequency of infrared energy incident thereupon from source 16 along transmission path 14. Such a biasing arrangement is well known in the art, and is disclosed for example in FIG. 7 of the Dillon application to which reference has already been made. An operating frequency for which transmission losses due to cyclotron resonance are less than 5 percent is suitable. Source 16 can comprise a black body infrared source such as a mercury arc lamp or a Globar, manufactured by Perkin-Elmer Corporation or it can comprise a stimulated emission device such as an infrared frequency optical maser.

Figure 2:
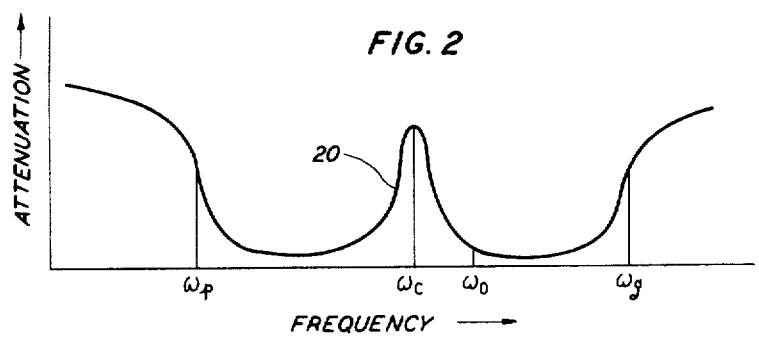
FIG. 2 is a graphical plot of absorption versus frequency for a semiconductive material exhibiting cyclotron resonance.

FIG. 2 graphically illustrates the relationship among several frequencies determined by physical properties of the slab 10 on the one hand and attenuation for infrared transmission on the other. In FIG. 2, frequency is plotted along the abscissa and attenuation along the ordinate, producing smooth curve 20. In general, transmission attenuation in semiconductive solids is high for frequencies up to the plasma frequency $\omega_p$, defined as $ne^2/\epsilon_0 m$ where $e$ is the carrier charge, and $\epsilon_0$ is the permittivity of free space. Beginning at the plasma frequency, and extending to the frequency $\omega_g$, the lowest frequency for which interband transitions occur, there is a spectral window within which transmission attenuation is typically low. Essential to the presence of the spectral window is a plasma frequency less than $\omega_g$. Semiconductors with light effective masses and low carrier densities are therefore particularly suitable. The cyclotron resonance frequency $\omega_c$ is defined as $eB/m$ where B is the intensity of an applied magnetic field. By properly choosing B, the frequency of cyclotron resonance can be made to fall within the spectral window, as shown in FIG. 2. For indium antimonide with $n=10^{14}$/cm.$^3$, $\omega_p$ is at $2,000\mu$, $\omega_g$ at $5\mu$, and $\omega_c$, for an applied field B of 10 kilogauss, is at $160\mu$.

Energy at $\omega_c$ applied to a magnetized sample will experience attenuation. At frequencies removed from $\omega_c$, and in the tail or wing of the cyclotron resonance attenuation curve, phase retardation will occur. It is known that the amount of phase retardation depends upon the sense of circular polarization of the incident wave. Since a plane polarized wave can be considered to be the composite of a pair of oppositely rotating circularly polarized waves, energy at $\omega_0$, for example, will experience a partial phase retardation greater for one polarization sense than the other, thereby effecting a rotation of the polarization phase of the incident energy. The amout of rotation depends, in addition to the parameters mentioned, upon sample thickness and the relaxation time $t$ of the material.

Returning now to the device of FIG. 1, the plane faces of slab 10 are shown to be perpendiuular to an axis designated $x$ in the coordinate system 15, and lying in the plane orthogonal axes $y$, $z$, which are mutually perpendicular to the $x$ axes. Polarizers 12, 13 are mounted along the $x$ axis one on each side of slab 10. Advantageously, these polarization selective devices can comprise the wire grid type polarizers for infrared frequencies described in an article by G. R. Bird and M. Parrish, Jr., in vol. 50 of the Journal of Optical Society of America, beginning at p. 886. Polarizer 12 is aligned to transmit infrared energy having a plane of polarization parallel to the $xy$ phase, while analyzing prism 13 is aligned to transmit energy having a polarization plane which is an integral multiple of 90 degrees from that transmitted by slab 10 in the presence solely of magnetic field B.

In accordance with the present invention, modulating voltage 18 is applied across slab 10 to cause currents to flow therein. It has been discovered that the relaxation time exhibited by slab 10 can be varied by raising the carrier (electron or holes) temperature independently of the lattice temperature which is held constant by cryostat 11. The carrier temperature can be changed by passing current through the sample, and by varying the magnitude of the current, the carrier temperature can be varied, thereby causing a corresponding variation in the relaxation time. Measurements have demonstrated that the carrier heating can occur as rapidly as $10^{-9}$ second. Thus, the modulating voltage 18 can be a microwave source, and connection to slab 10 can be made by a coaxial cable 19 with center conductor 21 connected to the top of slab 10 and outer conductor 22 connected to the bottom thereof.

The relative phase retardation introduced by slab 10 to incident infrared energy, and therefore the net polarization plane rotation produced thereby has been found to be dependent upon relaxation time $t$. Accordingly, by changing $t$, the net rotation can be changed. When the variation in $t$ is effected at its maximum of one kilomegacycle, rotation variations in the microwave frequency range are produced. Polarizer 13 therefore transmits infrared energy having an amplitude which is varying at microwave frequencies, and detector 12, which can comprise a bolometer or a photoconductive detector, such as for example the Indium Antimonide Photodetector manufactured by Mullard Limited, London, will receive microwave modulated energy in the infrared portion of the optical spectrum.

Figure 3:
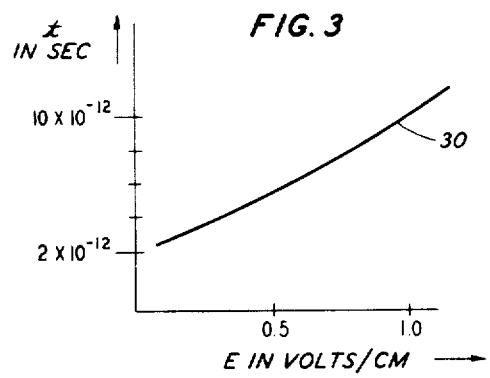
FIG. 3 is a graphical representation relating relaxation time and applied voltage in indium antimonide.

FIG. 3 illustrates, as curve 30, the general relationship between applied voltage E in volts as a function of relaxation time $t$ in seconds for a sample of indium antimonide .04 cm. thick subjected to a magnetic field of 10 kilogauss. In the absence of applied voltage, $t$ is equal to $2 \times 10^{-12}$ second. For an applied electric field of one volt per centimeter, the relaxation time increases to $10 \times 10^{-12}$ second. For this change in relaxation time, the rotation will change 60 degrees, and the intensity of the transmitted beam will vary accordingly.

For a relaxation time modulation arrangement in which operation is on one side of the cyclotron resonance line rather than on one wing thereof, 70 percent modulation of a 60 cm.$^{-1}$ signal can be realized for a 1 millimeter thick indium antimonide sample with $n=5 \times 10^{13}$/cm.$^3$ subjected to a 7.1 kilogauss biasing field. This direct amplitude modulation embodiment is operative for incident infrared energy which is either circularly polarized or linearly polarized.

In all cases it is understood that the above-described arrangements are merely illustrative of the many specific embodiments which can represent an application of the principles of the invention. Numerous and varied other arrangements can be devised in accordance with these principles by those skilled in the art without departing from the spirit and scope of the invention. Thus, for example the material comprising the rotation element is not intended to be limited to InSb and bismuth antimony alloy.

Additionally, the polarization selective elements can comprise other forms than those disclosed in the cited Bird et al. publication. Furthermore, when a polarized infrared source such as an iraser is employed, only a single polarization selective device, between rotation and detector is required.

What is claimed is:

1. A controllable phase retardation device for infrared energy comprising:
    a transmitting and rotating medium of semiconductive material having a plasma frequency $\omega_p$ less than the lowest frequency $\omega_g$ for which interband transitions occur,
    means for applying a magnetic field to said medium of a strength defining a cyclotron resonance frequency $\omega_c$ for said medium in the infrared region of the spectrum between $\omega_p$ and $\omega_g$,
    means for applying to said medium said infrared energy of a frequency $\omega_0$ different from $\omega_c$ but between $\omega_p$ and $\omega_g$,
    and means for raising the carrier temperature within said medium independently of its lattice temperature, said last mentioned means comprising a voltage source connected across said medium, whereby the phase retardation undergone by said infrared energy propagating through said medium is controllable by varying the voltage source.

2. The device according to claim 1 in which said medium comprises indium antimonide.

3. The device according to claim 1 in which said medium comprises bismuth antimony alloy.

4. A relaxation time modulator for infrared energy comprising:

an element of material having a cyclotron resonance frequency $\omega_c$ between the plasma frequency $\omega_p$ and the interband transition frequency $\omega_g$, the frequency $\omega_0$ of said infrared energy being different from $\omega_c$ but being between $\omega_p$ and $\omega_g$, said $\omega_g$ being greater than $\omega_p$, means for magnetically biasing said element to the vicinity of said cyclotron resonance condition, said element being characterized by a relaxation time, when magnetically biased at a constant lattice temperature, and means for varying the relaxation time, and means comprising a current producing voltage source connected across said element, a first polarization selective device positioned in the path of said infrared energy incident upon said element and, a second polarization selective device positioned in the path of the infrared energy existing from said element.

5. The device according to claim 1 in which there is further provided means for maintaining the said medium at a cryogenic temperature.

6. The device according to claim 5 in which said temperature is approximately that of liquid helium.

References Cited

UNITED STATES PATENTS

| | | | |
|---|---|---|---|
| 3,285,130 | 11/1966 | Cocca et al. | 350—160 |
| 2,987,959 | 6/1961 | Kimmel | 250—199 |
| 3,126,485 | 3/1964 | Ashkin et al. | 250—199 |
| 3,171,031 | 2/1965 | Yariv | 250—199 |
| 3,200,259 | 8/1965 | Braunstein | 250—199 |

OTHER REFERENCES

Bloembergen et al., Phys., Rev., vol. 120, No. 6, Dec. 15, 1960, pp. 2014–2023.

Lax, Advances In Quantum Electronics, Pub. 1961, pp. 465–479 (pp. 465–472 relied on).

Vogel et al., Electronics, Nov. 10, 1961, pp. 81–85.

ROBERT L. GRIFFIN, *Primary Examiner.*

BENEDICT V. SAFOUREK, *Assistant Examiner.*

U.S. Cl. X.R.

332—7.51; 350—150